(12) United States Patent
Hsiao

(10) Patent No.: US 6,857,644 B2
(45) Date of Patent: Feb. 22, 2005

(54) TOOL BOX PROVIDED WITH A SEAT UNIT

(76) Inventor: Chieh-Jen Hsiao, 2F, No. 215, Yu-Te Rd., Pei Dist., Taichung City (TW)

(*) Notice: Subject to any disclaimer, the term of this patent is extended or adjusted under 35 U.S.C. 154(b) by 110 days.

(21) Appl. No.: 10/417,019

(22) Filed: Apr. 16, 2003

(65) Prior Publication Data

US 2004/0145138 A1 Jul. 29, 2004

(30) Foreign Application Priority Data

Jan. 24, 2003 (TW) .................................... 92201412 U

(51) Int. Cl.⁷ ................................................. B62B 1/00
(52) U.S. Cl. ..................................... 280/79.2; 280/32.5
(58) Field of Search ............................... 280/79.2, 32.5, 280/32.6, 47.35; 297/338, 440.14–440.16; D6/335–338

(56) References Cited

U.S. PATENT DOCUMENTS

| | | | | |
|---|---|---|---|---|
| D276,861 S | * | 12/1984 | Keddie | D6/336 |
| D295,001 S | * | 4/1988 | Ferdinand et al. | D6/336 |
| 4,832,355 A | * | 5/1989 | Hung | 280/32.5 |
| 5,611,551 A | * | 3/1997 | Lin | 280/32.5 |
| 5,727,849 A | * | 3/1998 | Nelson | 297/440.16 |
| 5,755,489 A | * | 5/1998 | Rossman et al. | 297/338 |
| 6,010,187 A | * | 1/2000 | Dallas et al. | 297/188.08 |
| 6,688,615 B2 | * | 2/2004 | Chen | 280/47.35 |

* cited by examiner

Primary Examiner—Bryan Fischmann
(74) Attorney, Agent, or Firm—Ladas & Parry LLP

(57) ABSTRACT

A tool box includes a seat unit having left and right support panels mounted on left and right walls of a base. The left and right walls are formed with a plurality of lower slots. The left and right support panels have a plurality of lower inserts which are respectively inserted into the lower slots in the left and right walls, and top ends formed with a plurality of top inserts. A seat panel has two opposite mounting ends, each of which is formed with a plurality of upper slots for receiving the top inserts of the left and right support panels therein.

6 Claims, 6 Drawing Sheets

TOOL BOX PROVIDED WITH A SEAT UNIT

CROSS REFERENCE TO RELATED APPLICATION

This application claims priority of Taiwanese Application No. 092201412, filed on Jan. 24, 2003.

BACKGROUND OF THE INVENTION

1. Field of the Invention

The present invention relates to a tool box, more particularly to a tool box with a seat unit.

2. Description of the Related Art

Referring to FIG. 1, a conventional tool box 1 includes a base 11 and a seat unit 12.

As illustrated, the base 11 includes a peripheral wall 111 defining a tool-receiving space 112 therein. The seat unit 12 is mounted on the base 11 through a support unit 13 that is foldable and that includes left and right lower links 132 mounted pivotally on the base 11, and left and right upper links 131 that are pivotally connected to the seat unit 12 and the lower links 132 so as to permit adjustment of the seat unit 12 between upper and lower positions.

One disadvantage of the conventional tool box resides in that since no fastening device is used for immobilizing the upper and lower links 131,132 when a user sits on the seat unit 12, the seat unit 12 tends to be undesirably and accidentally moved from the upper position to the lower position.

SUMMARY OF THE INVENTION

Therefore, the object of this invention is to provide a tool box with a seat unit which is capable of overcoming the aforesaid disadvantage of the prior art.

A tool box according to the present invention includes: a base including a front wall, a rear wall opposite to the front wall, and opposite left and right walls, each of the left and right walls having a first segment proximate to the front wall and a second segment proximate to the rear wall, the first segments of the left and right walls cooperating with the front wall to define a tool-receiving space thereamong, the second segment of each of the left and right walls being formed with a plurality of lower slots; a seat unit including left and right support panels that are respectively mounted on the second segments of the left and right walls, and that have lower ends formed with a plurality of lower inserts which are respectively inserted into the lower slots in the second segments of the left and right walls, and top ends formed with a plurality of top inserts. The seat unit further includes a seat panel that extends in a transverse direction relative to the left and right support panels, and that has two opposite mounting ends, each of which is formed with a plurality of upper slots for insertion of the top inserts of a respective one of the left and right support panels thereinto, respectively. A cover member is pivoted to the front wall of the base so as to cover the tool-receiving space. A caster unit is mounted on the base.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENT

Figure 1:
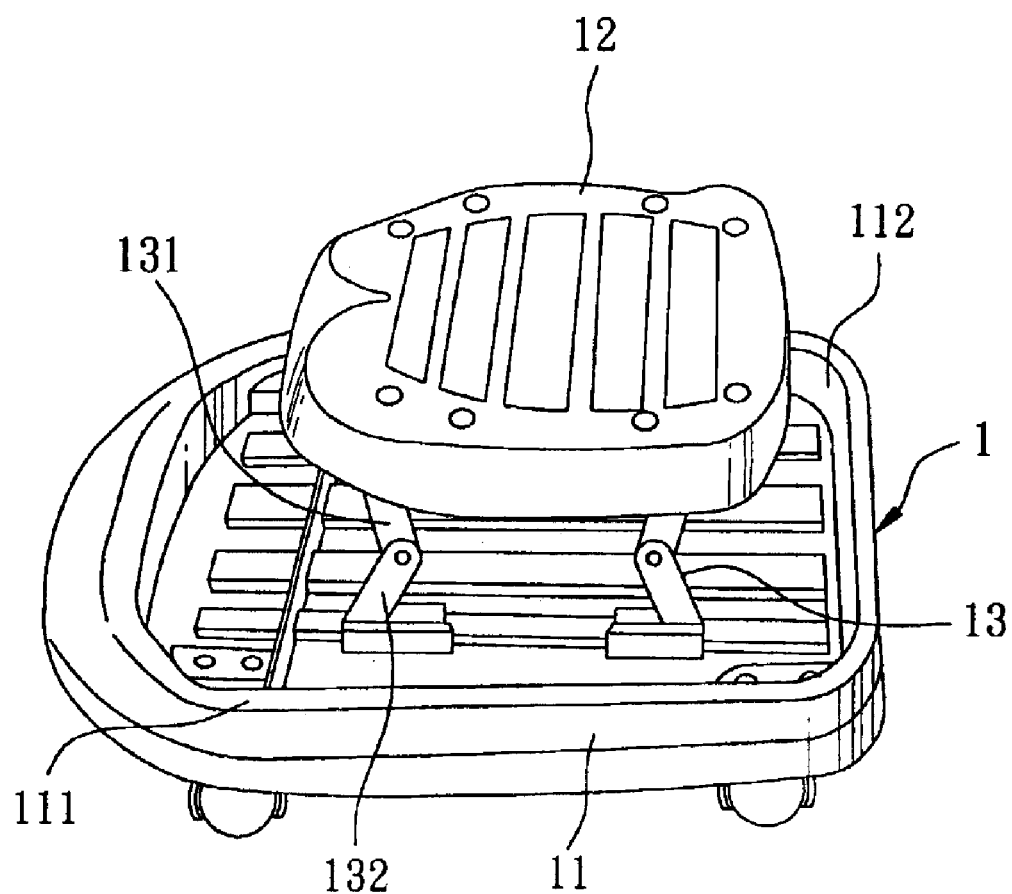
FIG. 1 is a perspective view of a conventional tool box with a seat unit.
Figure 2:
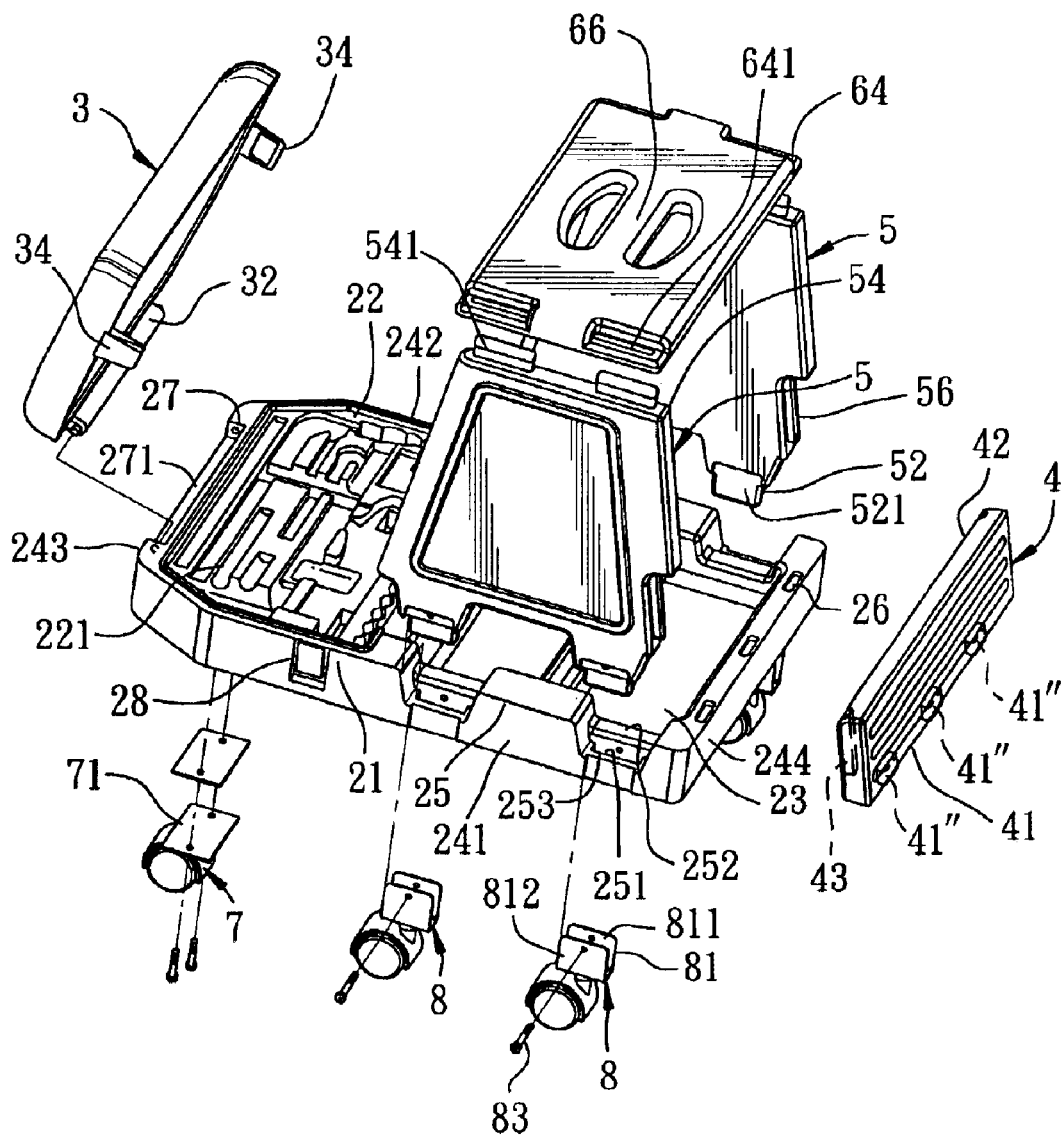
FIG. 2 is an exploded perspective view of the preferred embodiment of a tool box according to the present invention.
Figure 3:
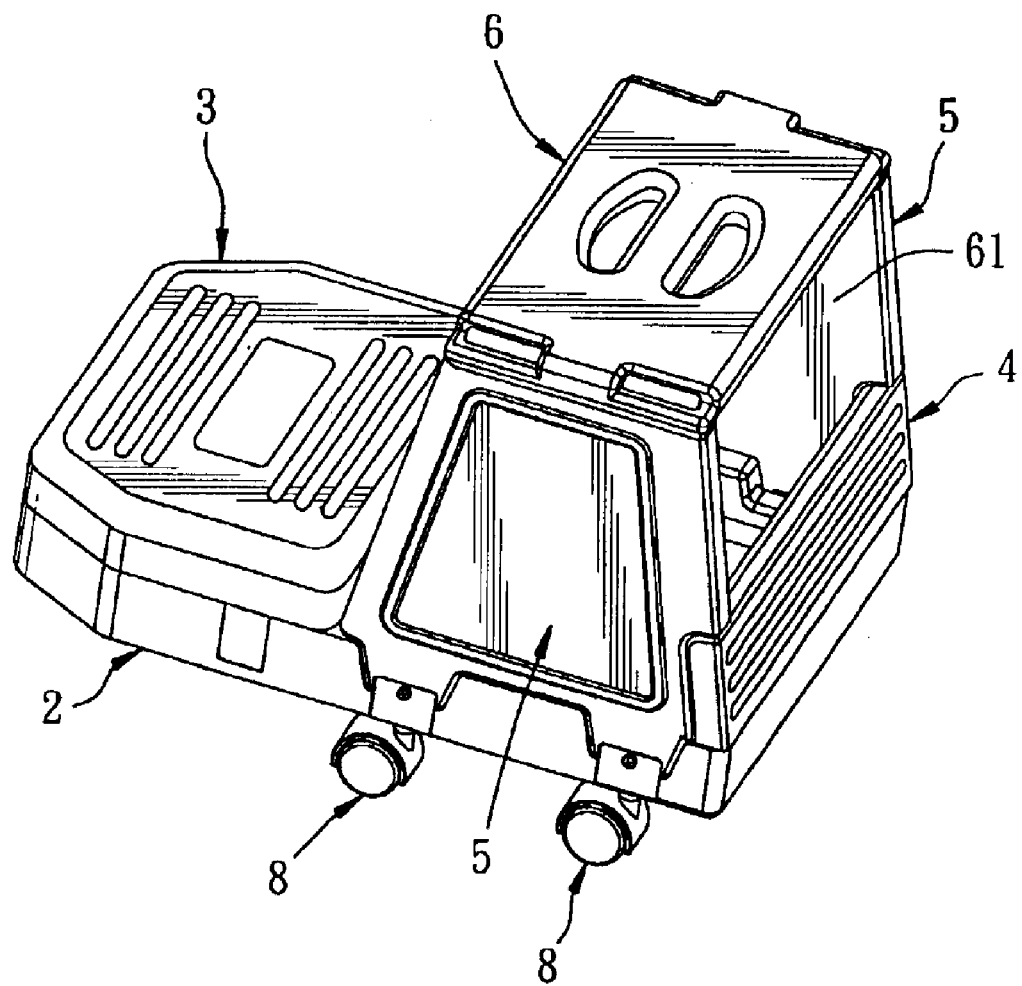
FIG. 3 is a perspective view of the preferred embodiment.

Referring to FIGS. 2 and 3, the preferred embodiment of a tool box according to the present invention is shown to include a base 2, a seat unit 6, a cover member 3, and a caster unit 7,8 that is mounted on a bottom of the base 2 and that includes a plurality of front and rear casters 71,81.

As illustrated, the base 2 is formed from plastic material by a blow-molding process, and includes a front wall 243, a rear wall 244 opposite to the front wall 243, and opposite left and right walls 241,242. Each of the left and right walls 241,242 has a first segment 21 proximate to the front wall 243 and a second segment 25 proximate to the rear wall 244. The first segments 21 of the left and right walls 241,242 cooperate with the front wall 243 to define a tool-receiving space 22 thereamong. The second segment 25 of each of the left and right walls 241,242 is formed with a plurality of lower slots 251.

Figure 6:
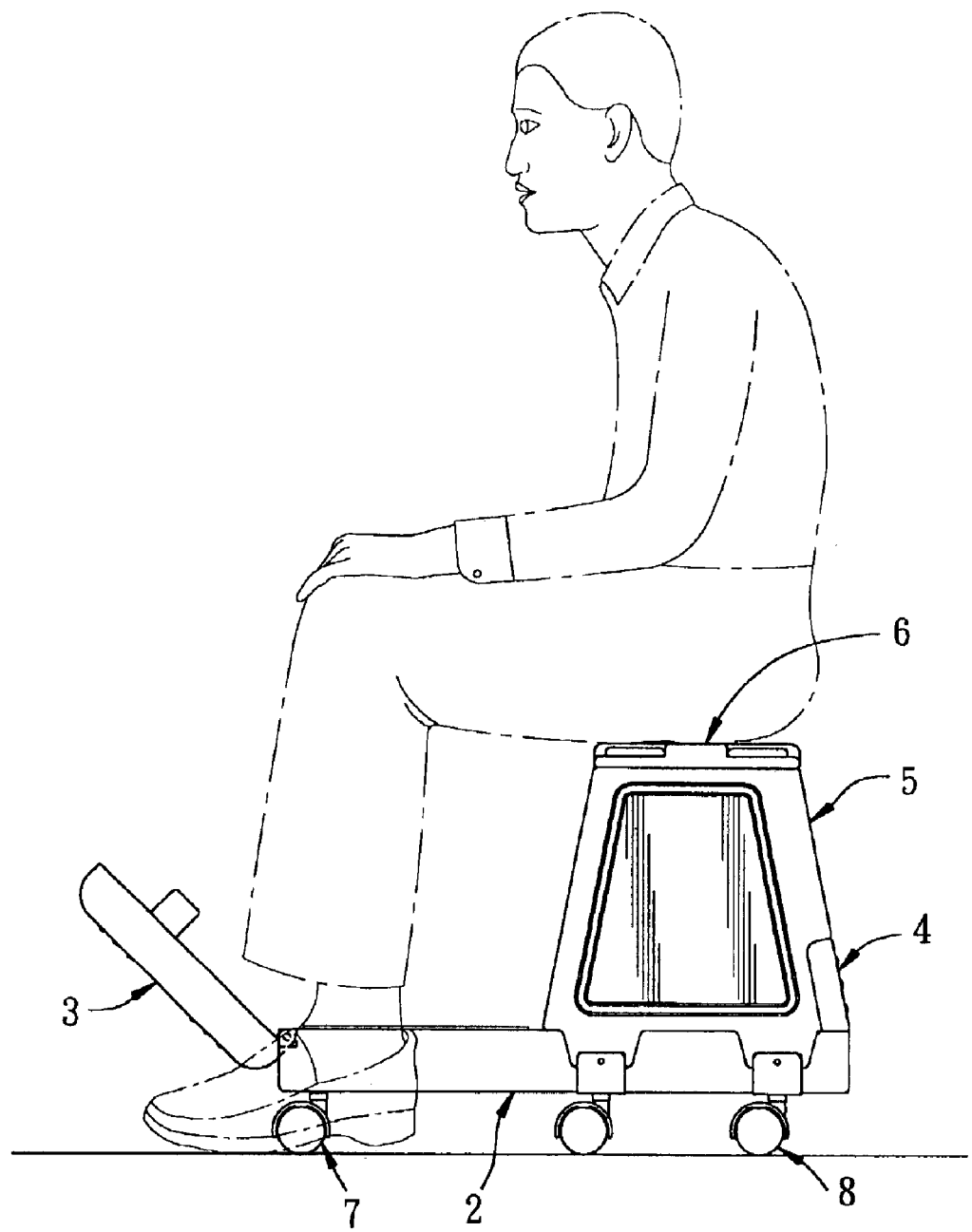
FIG. 6 shows a person seated on the seat unit of the preferred embodiment.

The seat unit 6 includes left and right support panels 5, a seat panel 66, and a rear support panel 4. The left and right support panels 5 are respectively mounted on the second segments 25 of the left and right walls 241,242, and have lower ends 52 formed with a plurality of lower inserts 521 which are respectively inserted into the lower slots 251 in the second segments 25 of the left and right walls 241,242, and top ends 54 formed with a plurality of top inserts 541. The seat panel 66 is disposed above and extends in a transverse direction relative to the left and right support panels 5, and has two opposite mounting ends 64, each of which is formed with a plurality of upper slots 641 for insertion of the top inserts 541 of a respective one of the left and right support panels 5 thereinto, respectively. The second segments 25, of the left and right walls 241,242 cooperate with the left and right support panels 5 to define a storage space 23 thereamong. The seat panel 66 is adapted to permit sitting of a person thereon (see FIG. 6).

The cover member 3 is formed with a pivot shaft 32 pivoted to a recess-defining wall 271 of a recess 27 formed in the front wall 243 of the base 2 so as to cover the tool-receiving space 22. The cover member 3 is further formed with left and right fasteners 34 which detachably and respectively engage two retention grooves 28 formed on outer surfaces of the first segments 21 of the left and right walls 241,242 so as to prevent untimely opening of the cover member 3. The tool-receiving space 22 is divided into a plurality of compartments 221 for receiving assorted tools (not shown) therein.

Figure 4:
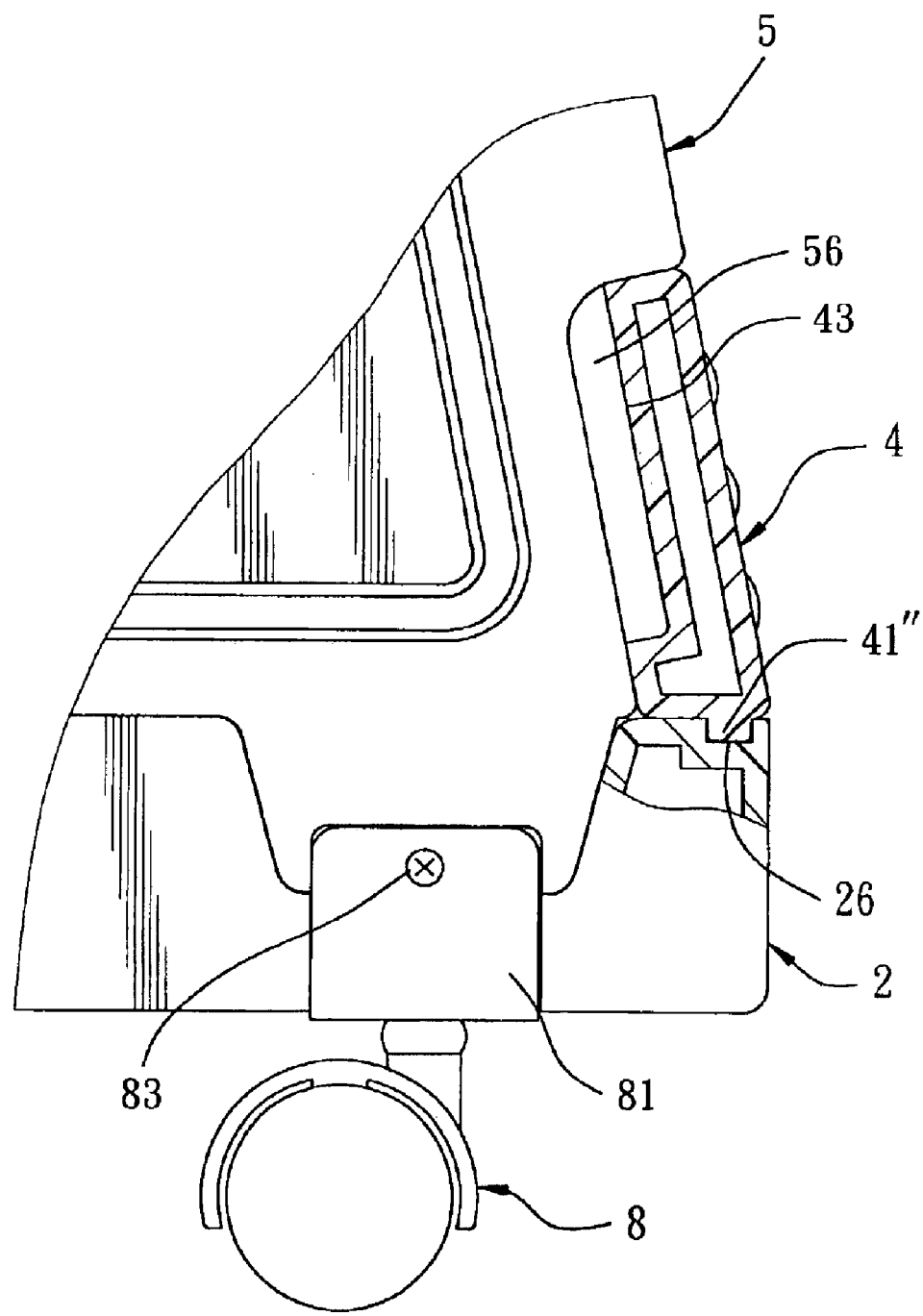
FIG. 4 is a fragmentary partly sectional view of the preferred embodiment, illustrating how a rear support panel is coupled to left and right support panels of a seat unit of the preferred embodiment.

The preferred embodiment further includes a groove-and-tongue device. The rear support panel 4 is mounted on the rear wall 244 of the base 2, and interconnects the left and right support panels 5 through the groove-and-tongue device so as to enhance stability of the seat unit 6 on the base 2. The groove-and-tongue device preferably includes a pair of spaced apart engaging grooves 43 formed in a front face 42 of the rear support panel 4, and a pair of tongues 56 projecting outwardly and respectively from rear ends of the left and right support panels 5 to engage the engaging grooves 43 in the rear support panel 4, as best shown in FIG. 4. The rear wall 244 of the base member 2 preferably has a top face formed with a plurality of upwardly open retaining bores 26. The rear support panel 4 has a lower end 41 and a plurality of engaging tongues 41" that project downwardly from the lower end 41 to engage the retaining bores 26 in the rear wall 244, respectively (see FIG. 4).

Figure 5:
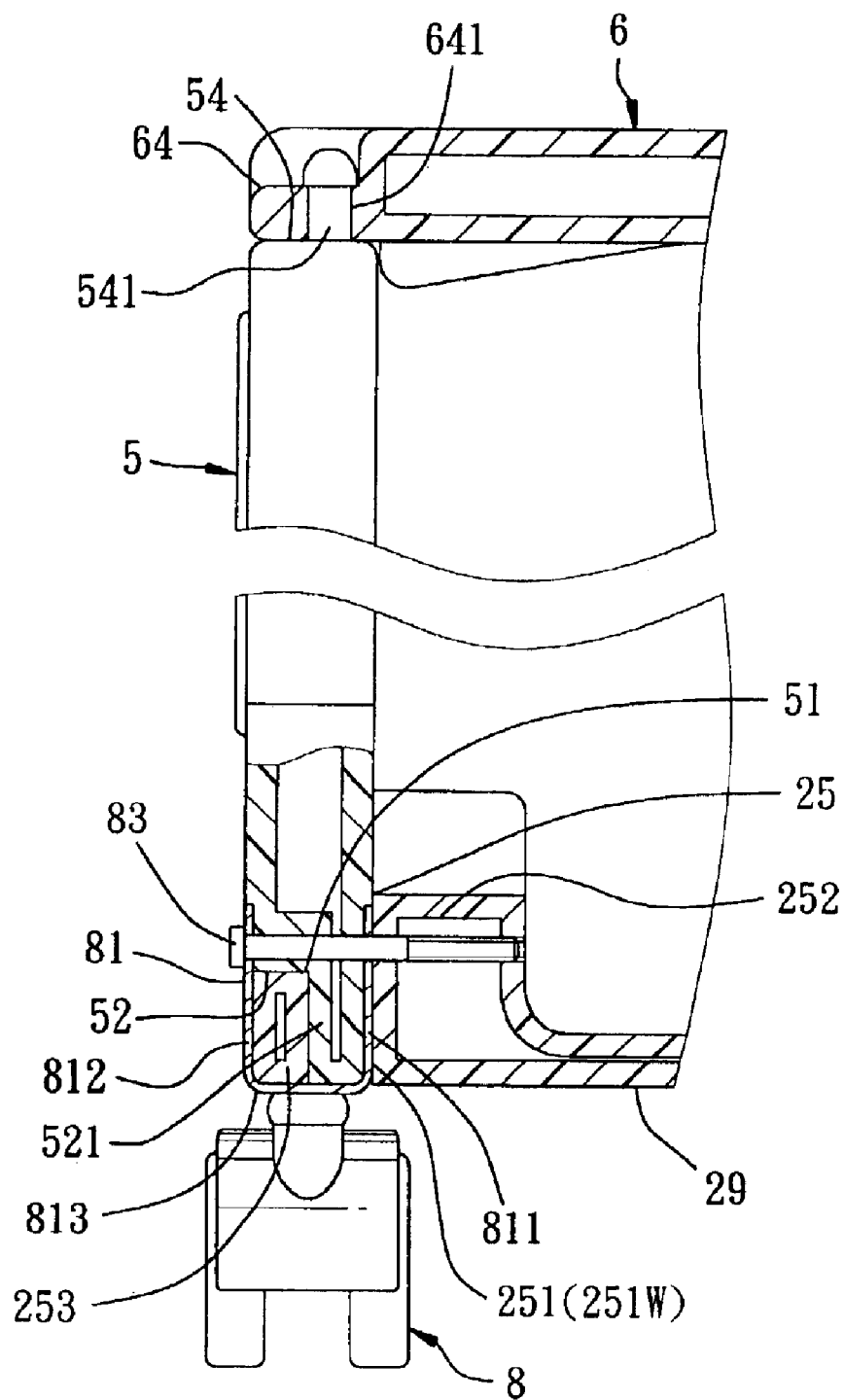
FIG. 5 is a fragmentary partly sectional view of the preferred embodiment, illustrating how a caster unit is mounted to a base of the preferred embodiment.

Referring to FIG. 5, in this preferred embodiment, each of the lower slots 251 is defined by a slot-defining wall 251W that has first and second wall portions 253,252 which are opposite to each other in the transverse direction. Each of the rear casters 81 includes first and second lugs 812,811 that are secured to the slot-defining wall 251W of a respective one of the lower slots 251 and to a respective one of the lower inserts 521 through screw means 83 in such a manner that each of the lower inserts 521 and the first wall portion 253 of the slot-defining wall 251W of the respective one of the lower slots 251 are tightly sandwiched between the first and second lugs 812,811 of a respective one of the rear casters 81, and that the second lug 811 of each of the rear casters 81 is inserted into the respective one of the lower slots 251, and is tightly sandwiched between the respective one of the lower inserts 521 and the second wall portion 252 of the slot-defining wall 251W of the respective one of the lower slots 251. The first wall portion 253 of the slot-defining wall 251W of each of the lower slots 251 has a top face. Each of the lower inserts 521 is formed with a neck 51 (see FIG. 5) that is seated on the top face of the first wall portion 253 of the slot-defining wall 251W of the respective one of the lower slots 251 so as to increase supporting area for the seat unit 6.

The seat unit 6 of the tool box according to the present invention provides enhanced stability as compared to that of the conventional tool box.

With this invention thus explained, it is apparent that numerous modifications and variations can be made without departing from the scope and spirit of this invention. It is therefore intended that the invention be limited only as indicated in the appended claims.

I claim:

1. A tool box comprising:
   a base including a front wall, a rear wall opposite to said front wall, and opposite left and right walls, each of said left and right walls having a first segment proximate to said front wall and a second segment proximate to said rear wall, said first segments of said left and right walls cooperating with said front wall to define a tool-receiving space thereamong, said second segment of each of said left and right walls being formed with a plurality of lower slots;
   a seat unit including left and right support panels that are respectively mounted on said second segments of said left and right walls, and that have lower ends formed with a plurality of lower inserts which are respectively inserted into said lower slots in said second segments of said left and right walls, and top ends formed with a plurality of top inserts, said seat unit further including a seat panel that extends in a transverse direction relative to said left and right support panels, and that has two opposite mounting ends, each of which is formed with a plurality of upper slots for insertion of said top inserts of a respective one of said left and right support panels thereinto, respectively;
   a cover member pivoted to said front wall of said base so as to cover said tool-receiving space; and
   a caster unit mounted on said base.

2. The tool box as defined in claim 1, wherein said seat unit further includes a groove-and-tongue device, and a rear support panel mounted on said rear wall of said base and interconnecting said left and right support panels through said groove-and-tongue device so as to enhance stability of said seat unit on said base.

3. The tool box as defined in claim 2, wherein said groove-and-tongue device includes a pair of spaced apart engaging grooves formed on said rear support panel, and a pair of tongues projecting outwardly and respectively from said left and right support panels to engage said engaging grooves in said rear support panel.

4. The tool box as defined in claim 3, wherein said rear wall of said base member has a top face formed with a plurality of upwardly open retaining bores, said rear support panel having a lower end and a plurality of engaging tongues that project downwardly from said lower end to engage said retaining bores in said rear wall, respectively.

5. The tool box as defined in claim 1, further comprising screw means, each of said lower slots being defined by a slot-defining wall that has first and second wall portions which are opposite to each other in said transverse direction, said caster unit including a plurality of rear casters, each of which includes first and second lugs that are secured to said slot-defining wall of a respective one of said lower slots and to a respective one of said lower inserts through said screw means in such a manner that each of said lower inserts and said first wall portion of said slot-defining wall of the respective one of said lower slots are tightly sandwiched between said first and second lugs of a respective one of said rear casters, and that said second lug of each of said rear casters is inserted into the respective one of said lower slots and is tightly sandwiched between the respective one of said lower inserts and said second wall portion of said slot-defining wall of the respective one of said lower slots.

6. The tool box as defined in claim 5, wherein said first wall portion of said slot-defining wall of each of said lower slots has a top face, each of said lower inserts being formed with a neck that is seated on said top face of said first wall portion of said slot-defining wall of the respective one of said lower slots.

* * * * *